United States Patent
Burmeister et al.

(10) Patent No.: US 6,853,625 B2
(45) Date of Patent: Feb. 8, 2005

(54) METHOD OF DYNAMICALLY TRANSMITTING DATA PACKETS USING RTP AND RTCP PROTOCOLS

(75) Inventors: Carsten Burmeister, Hamburg (DE); Rolf Hakenberg, Darmstadt (DE); Akihiro Miyazaki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 78 days.

(21) Appl. No.: 10/357,501

(22) Filed: Feb. 4, 2003

(65) Prior Publication Data
US 2003/0156550 A1 Aug. 21, 2003

(30) Foreign Application Priority Data

Feb. 13, 2002 (EP) .......................................... 02003361

(51) Int. Cl.[7] .............................................. G01R 31/08
(52) U.S. Cl. .................... 370/252; 370/234; 370/395.52
(58) Field of Search ................................ 370/230, 231, 370/232, 233, 234, 236.1, 252, 353, 354, 356, 395.52, 468, 254, 229, 235, 395.41

(56) References Cited

U.S. PATENT DOCUMENTS 6,643,496 B1 * 11/2003 Shimoyama et al. .......... 455/69
6,718,361 B1 * 4/2004 Basani et al. ................ 709/201
6,747,953 B1 * 6/2004 Qureshi et al. .............. 370/235

FOREIGN PATENT DOCUMENTS

| EP | 1111832 | 6/2001 |
|----|---------|--------|
| EP | 1120930 | 8/2001 |
| WO | 0203600 | 1/2002 |

OTHER PUBLICATIONS

S. Casner; "SDP Bandwidth Modifiers for RTCP Bandwidth," Internet Engineering Task Force, Internet–Draft, Audio/Video Transport Working Group, Packet Design, Nov. 20, 2001, pp. 1–7.

* cited by examiner

Primary Examiner—Phirin Sam
(74) Attorney, Agent, or Firm—Stevens, Davis, Miller & Mosher, LLP

(57) ABSTRACT

A method of transmitting data packets, in particular of real-time or near-real-time data over internet protocol (IP) networks using a real-time protocol (RTP) for media data products and a real-time control protocol (RTCP) for control data packets. Each protocol is allocated a fraction of the available transmission bandwidth. The method comprises the steps of measuring relevant characteristics of the network link, calculating from this measurement an optimized RTCP bandwidth and transmitting control data packets using the optimized RTCP bandwidth.

26 Claims, 1 Drawing Sheet

METHOD OF DYNAMICALLY TRANSMITTING DATA PACKETS USING RTP AND RTCP PROTOCOLS

Figure 1:
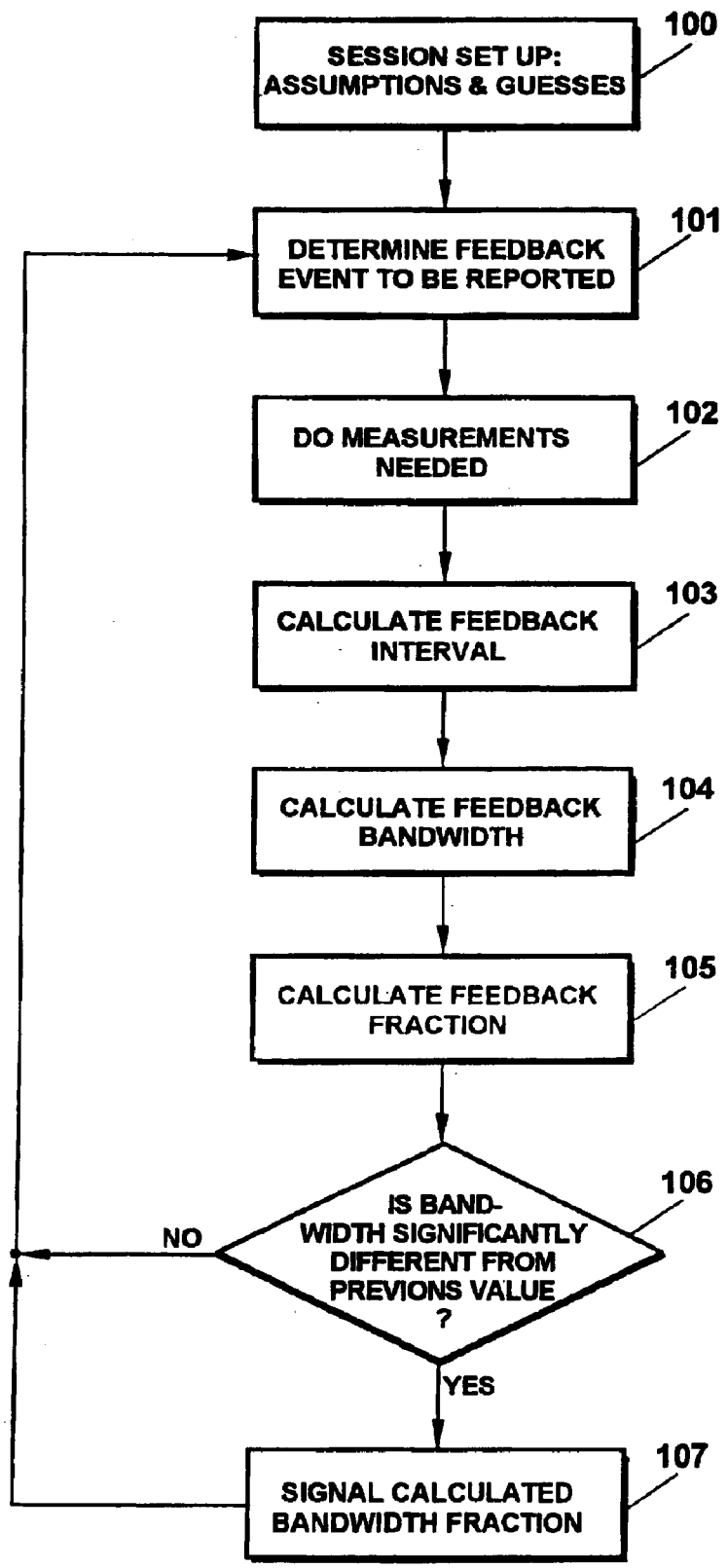

The present invention relates to data packet transmissions, in particular transmission of real-time or near-real-time data over International Protocol (IP) networks using standardized protocols.

Real-time Transport Protocol (RTP) is used widely for the transmission of real-time or near-real-time data over IP networks. It comes with a companion protocol named Real-time Transport Control Protocol (RTCP), which is used to monitor the transmission, collecting statistics and sending control data in the forward transmission direction or as a feedback from the receiver back to the sender.

RTP normally restricts the amount of feedback by two rules: First there is a certain fraction (recommended to be 5%) of the RTP session bandwidth allocated for RTCP. All receivers share this bandwidth and calculate from this value the time duration, during which they send the feedback. The second rule is that the interval between two feedback transmissions must be at least five seconds (five seconds as the recommended value).

While these rules make RTP stable and usable for large multicast groups, it is not optimized for unicast or small multicast transmissions. In these groups more feedback per user would be beneficial and could be sent. The problem was already identified and a new RTP protocol is standardized. With the new protocol, the rule that the interval between two feedback transmissions must be at least five seconds is omitted. Thus the receiver can send much more feedback, depending on the session parameters. The rule that the allocated RTCP session bandwidth must not be exceeded is still valid.

As mentioned above, the fraction of RTP bandwidth for the transmission of control data that is allocated for RTCP is generally fixed to a recommended value of 5%. However a solution is presently standardized to change this fraction to other values. The bit rate can also be set to zero in order to turn RTCP feedback off.

In addition network link parameters, such as the packet loss rate on a wireless link, are highly variable over time. Hence, the set RTP bandwidth might work well for a certain period of time, but after a while the performance and effectiveness of the transmission suffer from the varying link conditions.

The object of the present invention is to provide a method of transmitting data packets using RTP and RTCP protocols with an increased transmission efficiency.

This object is solved by a method as set forth in claim 1. Preferred embodiments of the method are subject to the various dependent claims.

The present invention is based on the consideration that the specific environment of a particular media session allows a greater flexibility with regard to the RTCP bandwidth. As control data per se does not increase the quality of the media stream, it is necessary to optimize the RTP bandwidth for the transmission of media data packets rather than using a fixed amount for the transmission of control data. On the other hand, the transmission of media data packets requires a certain amount of control data to be sent. With the conventional solution of allocating a fixed fraction of RTP bandwidth, the RTCP bandwidth was either too low resulting from the minimum interval over five seconds between two consecutive RTCP packets or more than needed.

For example, in a unicast media session, the 5% of the RTP session bandwidth allocated to RTCP results in a transmission time duration for the control data packets of only a few milliseconds. Consequently, allocated bandwidth is wasted and especially for links where bandwidth is a valuable resource, e.g. wireless links, the efficiency of the transmission is greatly reduced. On the other hand, especially wireless links require a fast feedback, e.g. to adapt the codec to varying link conditions and to signal to the sender that retransmission of media data packets is required.

The method of the present invention focuses on the idea of measuring the relevant characteristics of the network link for an individual media session and calculating from this measurement an optimized RTCP bandwidth. The calculated bandwidth is then used for the transmission of control data packets while media data packets are transmitted using the remainder of the available bandwidth. In this way, an optimized bandwidth allocation is obtained with maximum efficiency for transmission of media data packets and allocation of RTCP bandwidth in a sufficient manner to provide control data at an appropriate rate. Thus, different optimized bandwidth allocation resulting in most efficient transmissions can be achieved for respective different links.

Furthermore, by continuously measuring the relevant characteristics of the network link, the state of the transmission channel and its environment can be determined and the RTCP bandwidth dynamically changed accordingly. Thus, the transmission system can be driven continually at an optimized compromise between the amount of control data and efficiency of the transmission on the link.

According to a preferred embodiment, the step of measuring the relevant network link characteristics comprise the measurement of the number of data packets sent per time interval.

According to a further preferred embodiment, the number of packets lost divided by the number of packets sent in a certain time interval is measured in order to determine the quality of the link.

As a further preferred embodiment, the measurement of the time it takes a packet to be transmitted from a server to a client and back to the server is taken as a measure for the round trip time of the network link. It is furthermore preferred that the characteristics of the network link are measured under determination of the congestion state.

Preferably, all measurements of the irrelevant characteristics are carried out periodically at regular intervals in order to allow the system to be continually driven at an optimized RTCP bandwidth. Advantageously, the optimized RTCP bandwidth is signaled from a client to a server as a feedback.

Preferably, the method of the present invention comprises the further step of calculating an optimum feedback interval between two successive transmissions of control data packets.

In the following, the invention will be described in more detail with reference to FIG. 1 which shows a flow chart illustrating the preferred embodiment of the invention as a sequence of steps.

As apparent from FIG. 1, at the start of a media session, it has to be determined whether measurement results of the relevant characteristics of the network link are existent. If no samples are available yet, assumptions and guesses have to be made in step 100.

In step 101 the application has to choose which kind of feedback is needed. The new RTP protocol is generally not limited to certain feedback types. Regular status reports, negative or positive acknowledgements may serve as examples.

Regular status reports are usually used from the sender to evaluate the network condition and to adapt transmission parameters thereafter. Examples could be congestion control algorithms, which need to be informed about the network packet loss rate typically at least once per round trip time.

Negative acknowledgements (NACK) are used at the sender to invoke error resilience features. This could imply retransmissions or changing coding parameters, e.g. to make the new data usable independently from the lost data.

Positive acknowledgements (ACK) are typically used to increase the efficiency of the coding or transmission. If the sender knows about received data, it can use this as a reference for the coding of the next data.

As the events described above can be used either independently or in any combination, the feedback can also be usable independently or combined. A typical example could be regular feedback about the measured packet loss rate, needed for the sender's congestion control algorithm and NACK for all lost packets to invoke retransmissions of the lost data.

The next step 102 in FIG. 1 requires measuring the needed input parameters for the calculation of the optimized RTCP bandwidth fraction. These measurements have to be repeated periodically, as the network link characteristics change over time. The measurements to be done are dependent on the kind of feedback. Common measurements that can enable optimized RTCP bandwidth for the kinds of feedback described above comprise (not exhaustive) for example:

Packet Rate:

The packet rate is the number of packets that is sent per time interval. This parameter might be known a priori, but might also be variable. Examples could be a server that adjusts the sending packet rate according to congestion state of the network, which itself is variable with time. The client measures the packet rate, by counting the number of packets per time interval. As there might be packets lost on the transmission path from server to client, the measurement should be repeated periodically and an average over some measurements should be used. A typical way of doing this is to use a running average, i.e. calculating:

$$pr\_new=(1/w*pr\_m)+((w-1)/w*pr\_old)$$

where pr_new is the new average packet rate, pr_old is the last averaged packet rate, pr_m is the current measurement sample of the packet rate and w is a weighting factor, which determines the influence of new measurements on the average.

Packet Loss Rate:

The packet loss rate is defined as the number of packets lost divided by the number of packets sent in a certain time interval. As the packet loss rate is often highly variable over time, e.g. depending on link conditions, the time interval that is chosen for the measurement is crucial for a correct sample. Typical values are once per round trip time or multiple of those.

Round Trip Time (RTT):

The round trip time is defined as the time it would take a packet to be transmitted from the server to the client and back to the server. This value is also highly variable over time, depending on network status, e.g. congestion and other issues. Typically the measurements of the round trip time are also done on a running average basis as described for the packet rate.

As mentioned before, if the media session has not started, but is to be set-up, no measurements might be available yet. Thus, assumptions on the values have to be made. Typically these values can be estimated to the correct order of magnitude.

As a next step 103 a calculation of the interval between two transmissions of feedback is performed. The feedback interval is dependent on the measurements above, but also on the kind of feedback. If regular feedback is needed, e.g. once per RTT, the maximum feedback interval can be easily estimated to the RTT. If certain events are to be reported, e.g. packet reception or packet loss, the mean interval between these events has to be calculated. In the case of ACK this is the packet inter-arrival time, which is 1/packet rate. In case of NACK, it is the packet inter-arrival time divided by the average packet loss rate.

The RTCP protocol ensures that short term variations in the intervals can be compensated, as long as the long term average inter-event time is quite stable.

In order to properly calculate the required RTCP bandwidth (step 104), it is preferable to know the size of the feedback packets. While for most applications, the packet size will be fixed during the session, it might also be variable, e.g. in cases of loss events, there may be more than one loss event to report in one feedback packet. Hence, an average value of the feedback packet size should be used.

With the size of the feedback packets, s_fb [bit], and the feedback rate, r_fb [1/s], the needed average RTCP bandwidth (in bit per second) can be calculated as bw_rtcp=s_fb*r_fb.

The RTP session bandwidth bw_rtp is fixed for the duration of the session. A calculation of the RTCP bandwidth fraction is obtained in step 105 by: f_rtcp=bw_rtcp/bw_rtp.

In a next step 106, the newly calculated bandwidth fraction is compared with the respective previous value. If the comparison reveals a significant difference, the new bandwidth fraction is signaled to the sender as indicated in step 107.

The signaling of a new RTCP bandwidth fraction value can be related to some overhead. It might be needed to tear down the existing session and start a new one with the new RTCP bandwidth fraction thereafter. However changes on the fly might be possible as well.

This has to be taken into account, when deciding if the new bandwidth fraction value should be signaled or not. If it is not significantly different from the previous value, it might not be worth the effort. The feedback approach is non-deterministic, which means that feedback for the events is not guaranteed anyway. The probability of the possibility to send feedback in time is just increased. Thus the overhead of signaling new values has to be waged carefully against the benefit.

In case of a decision to change the fraction and the use of existing signaling protocols, the following actions are required:

If no session set-up has been fulfilled, the bandwidth fraction is signaled with the section description protocol SDP. If a session was already established, this has to be torn down by sending an RTCP BYE message and a new session has to be set-up, where the RTCP bandwidth is signaled by SDP. Other possibilities of signaling the calculated RTCP bandwidth fraction might be possible.

After the steps 101–107 have been completed, they are repeated periodically. By going through these steps, an optimized bandwidth fraction value is continuously used over the whole session. Variable channel environment states are compensated by regular measurements, corrections and dynamic changes of the RTCP bandwidth fraction while with a static modification of the RTCP bandwidth, the fraction calculated at the beginning of the session is based on assumptions and known parameters rather than measurements. In the latter case, the RTCP bandwidth is not changed during the session leading to inaccurate values and low performance. These drawbacks are compensated with the dynamic recalculation in response to changes during an ongoing session.

What is claimed:

1. A method of transmitting data packets, in particular of real-time or near-real-time data over an internet protocol (IP) network using a real-time protocol (RTP) for transmission of media data products and a real-time control protocol (RTCP) for feedback-transmission of control data packets, each protocol being allocated a fraction of the available transmission bandwidth, said method comprising:

(a) determining the type of feedback, (b) measuring relevant characteristics of the network link by a technique that is in accordance with a result of step (a), (c) changing an RTCP bandwidth to be used for transmitting control data packets from a transmitting end to a receiving end or from a receiving end to a transmitting end in accordance with a result of step (b), and (d) transmitting control data packets using the RTCP bandwidth changed in step (c).

2. The method according to claim 1, wherein step (b) comprises measurement of the number of data packets sent per time interval.

3. The method according to claim 1, wherein step (b) comprises determining the number of packets lost during transmission.

4. The method according to claim 1, wherein step (b) comprises determining the time it takes a packet to be transmitted from a server to a client and back to the server.

5. The method according to claim 1, wherein step (b) comprises determining the congestion state of the IP network.

6. The method according to claim 1, wherein step (b) is effected periodically at regular intervals.

7. The method according to claim 1, further comprising signaling the RTCP bandwidth changed in step (c) from a client to a server as a feedback.

8. The method according to claim 1, wherein the control data packets are one of a regular status report, a positive acknowledgment of a transmission event, and or a negative acknowledgment of a transmission event.

9. The method according to claim 1, further comprising calculating an optimum feedback interval between two successive transmissions of control data packets.

10. The method according to claim 1, further comprising, before step (c), a step of calculating an optimum RTCP bandwidth based on the relevant characteristics of the network link.

11. The method according to claim 10, wherein the step of calculating an optimum RTCP bandwidth comprises measuring an average rate of control data packets.

12. The method according to claim 10, wherein the step of calculating an optimum RTCP bandwidth comprises measuring the size of control data packets.

13. A server device transmitting or receiving data packet, in particular of real-time or near-real-time data over an internet protocol (IP) network using a real-time protocol (RTP) for transmission or reception of media data products and a real-time control protocol (RTCP) for feedback-transmission or feedback-reception of control data packets, each protocol being allocated a fraction of the available transmission bandwidth, said device comprising:

a feedback reception section that receives an optimum RTCP bandwidth as a feedback from a client, a changing section that changes an RTCP bandwidth to be used for transmitting control data packets from a transmitting end to a receiving end or from a receiving end to a transmitting end in accordance with the received feedback, and a control data packet transmission section that transmits control data packets by using the RTCP bandwidth changed by the changing section.

14. A program of transmitting or receiving data packets, in particular of real-time or near-real-time data over an internet protocol (IP) network using a real-time protocol (RTP) for transmission or reception of media data products and a real-time control protocol (RTCP) for feedback-transmission or feedback-reception of control data packets, each protocol being allocated a fraction of the available transmission bandwidth, said program comprising (a) receiving an optimum RTCP bandwidth as a feedback from a client (b) changing an RTCP bandwidth to be used for transmitting control data rackets from a transmitting end to a receiving end or from a receiving end to a transmitting end in accordance with the received feedback, and (c) transmitting control data packets using the RTCP bandwidth changed in operation (b).

15. A client device transmitting or receiving data packets, in particular of real-time or near-real-time data over an internet protocol (IP) network using a real-time protocol (RTP) for transmission or reception of media data products and a real-time control protocol (RTCP) for feedback-transmission or feedback-reception of control data packets, each protocol being allocated a fraction of the available transmission bandwidth, said device comprising:

a determination section that determines the type of feedback, a measurement section that measures relevant characteristics of the network link by a technique which is in accordance with the type of feedback determined by the determination section, a calculation section that calculates an RTCP bandwidth to be used for transmitting control data packets from a transmitting end to a receiving end or from a receiving end to a transmitting end, in accordance with the measurement by the measurement section, and a transmission section that transmits control data packets using the calculated RTCP bandwidth.

16. The client device according to claim 15, wherein the measurement section measures the number of data packets sent per time interval.

17. The client device according to claim 15, wherein the measurement section determines the number of packets lost during transmission.

18. The client device according to claim 15, wherein the measurement section determines the time it takes a packet to be transmitted from a server to the client and back to the server.

19. The client device according to claim 15, wherein the measurement section determines the congestion state of the IP network.

20. The client device according to claim 15, wherein the measurement section measures the relevant network link characteristics periodically at regular intervals.

21. The client device according to claim 15, further comprising a signaling section that signals a changed RTCF bandwidth from the client to a server as a feedback.

22. The client according to claim 15, wherein the control data packets are one of a regular status report, a positive acknowledgment of a transmission event, and a negative acknowledgment of a transmission event.

23. The client device according to claim 15, further comprising a second calculation section that calculates an optimum feedback interval between two successive transmissions of control data packets.

24. The client device according to claim 15, wherein the calculation section comprises means for measuring an average rate of control data packets.

25. The client device according to claim 15, wherein the calculation section comprises means for measuring the size of control data packets.

26. A program of transmitting or receiving data packets, in particular of real-time or near-real-time data over an internet protocol (IP) network using a real-time protocol (RTP) for transmission or reception of media data products and a real-time control protocol (RTCP) for feedback-transmission or feedback-reception of control data packets, each protocol being allocated a fraction of the available transmission bandwidth, said program comprising (a) determining the type of feedback, (b) measuring relevant characteristics of the network link by a technique which is in accordance with the type of feedback determined in operation (a), (c) calculating an RTCP bandwidth to be used for transmitting control data packets from a transmitting end to a receiving end or from a receiving end to a transmitting end, in accordance with a result of operation (b), and (d) transmitting, with a transmission section, control data packets using the calculated RTCP bandwidth.

* * * * *